United States Patent [19]

Schell et al.

[11] Patent Number: 5,530,853
[45] Date of Patent: Jun. 25, 1996

[54] METHOD FOR FILTERING ITEMS IN A COMPUTER APPLICATION PROGRAM CONTAINER OBJECT USING FILTER DATA FOR RELATED ENTRIES IN A CONTAINER OBJECT OF ANOTHER APPLICATION PROGRAM

[75] Inventors: David J. Schell, Trophy Club; Lovie A. Melkus, Southlake, both of Tex.

[73] Assignee: International Business Machines Corportaion, Roanoke, Tex.

[21] Appl. No.: 400,784

[22] Filed: Mar. 6, 1995

Related U.S. Application Data

[63] Continuation of Ser. No. 975,072, Nov. 12, 1992, abandoned.

[51] Int. Cl.$^6$ ........................................ G06F 17/30
[52] U.S. Cl. .................... 395/600; 395/416; 395/417; 395/54; 364/DIG. 1; 364/282; 364/253.1; 364/286
[58] Field of Search ............................... 395/600, 149, 395/144, 417, 416, DIG. 1, 54

[56] References Cited

U.S. PATENT DOCUMENTS

| | | | |
|---|---|---|---|
| 4,805,099 | 2/1989 | Huber | 395/600 |
| 4,918,593 | 4/1990 | Huber | 395/600 |
| 5,117,349 | 5/1992 | Tirfing et al. | 395/600 |
| 5,204,956 | 4/1993 | Danuser et al. | 395/575 |
| 5,249,262 | 9/1993 | Baule | 395/66 |
| 5,293,615 | 3/1994 | Amada | 375/600 |
| 5,301,315 | 4/1994 | Pellicano | 395/600 |
| 5,317,730 | 5/1994 | Moore et al. | 395/600 |

OTHER PUBLICATIONS

Microsoft Excel User's Guide 2 Version 4.0 Chapter 3 pp. 121–152. Copyright 1984–1992.
Paradox User's Guide, Borbad International 1990, pp. 44–106.

*Primary Examiner*—Thomas G. Black
*Assistant Examiner*—Jean R. Homere
*Attorney, Agent, or Firm*—William L. Clayborn; John M. Cone

[57] ABSTRACT

Items in a container object of a first computer application program are filtered using filter data for related entries in a container object of a second computer application program.

13 Claims, 2 Drawing Sheets

FIG. 1

```
FROM:   (                    )  ~1
TO:     (                    )  ~3
SUBJ:   (                    )  ~5
DATE:   (                    )  ~7
        (TEXT                )  ~9
CC:     (                    )  ~11
```

FIG. 2

```
NAME: (                      )  ~21
TELEPHONE NUMBER: (          )  ~23
DEPARTMENT: (         )         ~25
STATUS: (         )             ~27
```

FIG. 4

```
FROM:                           ~31
TO:              *              ~33
SUBJ:     EXPENSE REPORTS       ~35
DATE:                           ~37
CC:              *              ~39
TELEPHONE NUMBER:               ~41
DEPARTMENT:      9B2            ~43
STATUS:                         ~45
ADDRESS BOOK:    NETWORK        ~47
```

METHOD FOR FILTERING ITEMS IN A COMPUTER APPLICATION PROGRAM CONTAINER OBJECT USING FILTER DATA FOR RELATED ENTRIES IN A CONTAINER OBJECT OF ANOTHER APPLICATION PROGRAM

This is a continuation of application Ser. No. 07/975,072, filed Nov. 12, 1992, now abandoned.

BACKGROUND OF THE INVENTION

The present invention relates to filtering items in a computer application program container object. By filtering is meant comparing data contained one or more specified item data fields with user-entered filter data, and selecting only those items whose data match the filter data. More specifically, the present invention relates to an improved filtering method which allows a computer user to filter such items using data contained in the items and data contained in an address book data base.

Computer users frequently find it advantageous to filter the items in a computer application program container object, such as a file cabinet, a file cabinet drawer, a folder within a file cabinet drawer, or an electronic mail in-basket or out-basket. For example, a user might desire a list of all the items contained by a file cabinet which were sent by a specific person, i.e., items in which that specific person is the addressor. Such a list may be compiled by using the person's name to filter the addressor data fields of each item.

Presently, a computer user may filter items using filter data for data contained in the items. Thus, a computer user may typically filter the items using filter data for such data as the addressor's name, an addressee's name, the subject of the item, the date of the item, and the name of a person to whom a copy of the item was sent.

The present invention allows a computer user to filter items in a container object using filter data for data contained in an address book data base and data contained in the items. As address book data bases may contain such additional data as a person's department, address, and status (management, nonmanagement, etc.), the invention provides an extended filtering method which is much more flexible and comprehensive than methods presently available.

SUMMARY OF THE INVENTION

An extended method for filtering items contained in a computer application program container object is provided which allows the computer's user to filter the items using data contained in the items and data contained in an address book data base.

The user first selects the desired container object, then enters filter data with which the items in the container are to be filtered. The filter data may correspond to item data fields and/or address book data base data fields. If address book-based filter data is entered, the user designates at least one item data field which contains person-related data, such as a person's name, "system name" or "user ID" (collectively hereinafter "name") to indicate that address book data fields associated with the person's name are to be filtered.

The items in the selected container object are then filtered with the item-based filter data, and the items which pass that filter are listed on a temporary list. If no item-based filter data is entered by the user, all the items in the container are listed on the temporary list.

For each item on temporary list, the name or names contained in the designated item data fields are listed. The address book data fields associated with each name listed for an item are then filtered with the corresponding address book-based filter data. If the filter data matches the address book data, the item passes the filter and is listed on a filtered item list. If no address book-based filter data was entered by the user, the temporary list is copied on the filtered item list.

Finally, a list of the items on the filtered item list is displayed.

BRIEF DESCRIPTION OF THE DRAWING

An embodiment of the invention will be described, by way of example only, with reference to the accompanying drawings, in which:

FIG. 1 is a pictorial representation illustrating the format of an item which may be filtered by the method of the present invention;

FIG. 2 is a pictorial representation illustrating the format of an address book data base entry which may be used to filter the item of FIG. 1;

FIG. 4 is a pictorial representation of a screen for entering filter data.

DETAILED DESCRIPTION

Figure 3:
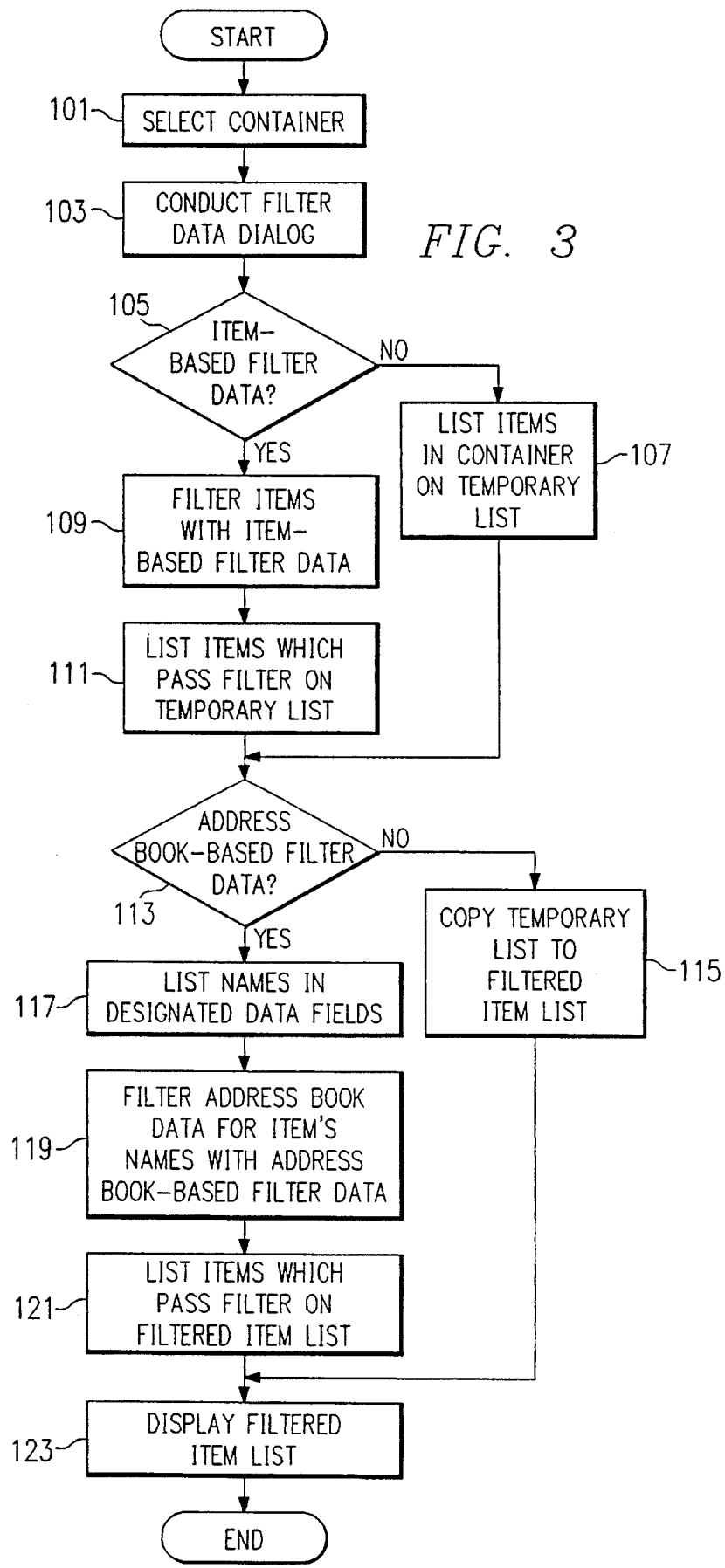
FIG. 3 is a block diagram showing the operation of a preferred embodiment of the present invention.

The following description of an embodiment of the present invention assumes a computer which is a part of an electronic mail network and an application program for a digital computer which, at a minimum, allows the computer's user to retrieve various items to which the computer has access and to file those items in one or more container objects. Such application programs are known to those skilled in the art. In addition, it is assumed that the computer has access to at least two address book data bases.

As seen in FIG. 1, an item format includes data fields (indicated by the parentheses) for the item's addressor 1, addressee or addressees 3, subject 5, date 7, text 9, and copy recipient or recipients 11. It is to be understood that an item will have at least one data field for each addressee or copy recipient.

FIG. 2 illustrates the format of an address book data base entry including data fields (indicated by the parentheses) for a person's name 21, telephone number 23, department 25, and status 27.

FIG. 3 is a flow diagram of the method of the present invention. To illustrate the operation of the invention, suppose that a computer user wishes to compile a list of the items in a computer file cabinet object which relate to the subject "Expense Reports" and which are addressed or copied to persons in department 9B2.

At block 101, the user indicates that a filter action is required and selects the container object whose contents are to be filtered. With a computer equipped with a conventional mouse, the user drags a filter action icon (not shown) and drops it on the desired container object icon (not shown). That is, the user places the mouse pointer on the filter action icon, depresses and holds a mouse button, drags the filter action icon to the desired file container object icon, and releases the mouse button. Alternately, the user may drag the container object icon and drop it on the filter action icon.

At block 103, the program displays a screen on which the user enters the desired filter data. FIG. 4 shows a filter data screen on which the user has entered the data required to compile the list of the example. As can be seen, the user has entered "Expense Reports" in the Subject data field 35 and "9B2" in the Department data field 43. It will be recalled that an item does not include a Department data field. The asterisks entered in the addressee data field 33 and the copy recipient data field 39 indicate that address book data for the persons named in the items' addressee 3 and copy recipient 9 data fields (FIG. 1) are to be filtered using the address book filter data (in this case, Department 9B2). In this example, to specify that a network address book data base is to be used when filtering the items, the user has entered "Network" in the address book data field 47.

In an alternate embodiment of the present invention (not shown), the computer user may define one or more filters before selecting the container object which contains the items to be filtered. The filter or filters are defined using an interactive dialog such as that described above in connection with block 103, and the program assigns a unique icon to each filter. When using one of the predefined filters, the user selects the container object in the manner described above in connection with block 101.

Aft block 105, the program determines whether filter data relating to one or more item data fields was entered at block 103. If so, the program proceeds to block 109. If not, the program continues on to block 107.

In the example, the user entered filter data ("Expense Reports") in an item-based filter data field (Subject 35). Thus, in the example, the program proceeds to block 109. If the user had not entered item-based filter data at block 103, the program would continue to block 107, where the program would list the items in the file cabinet on a temporary list.

At blocks 109 and 111, the program filters the items in the file cabinet with the item-based filter data and lists those items which pass the filter on the temporary list. Techniques for filtering items are well known in the art and will not be discussed here.

At block 113, the program determines whether filter data relating to one or more address book data fields was entered at block 103. If so, the program proceeds to block 117. If not, the program continues to block 115.

In the example, the user entered address book-based filter data at block 103 ("9B2" in the Department data field 35). Therefore, the program proceeds to block 117. If the user had not entered address book-based filter data at block 103, the program would continue to block 115, where the program would copy the list of items on the temporary list to a filtered item list and proceed to block 123.

At block 117, for each item listed on the temporary list, the program lists the names in the item data fields corresponding to the filter data fields in which asterisks were entered at block 103.

At block 119, using the address book-based filter data entered at block 103, the program filters the address book data fields associated with each name listed at block 117. If the data associated with a name listed at block 117 matches the address book-based filter data, the item from which the name came passes the filter. At block 121, the program lists those items which pass the filter of block 119 on the filtered item list.

In the example, for each item listed on the temporary list, the program filters the address book data fields associated with the names contained in the item's addressee and copy recipient data fields. If the address book data fields associated with any such name indicates that the person is in department 9B2, then the program lists the item on the filtered item list.

At block 123, the program displays the filtered item list. In the example, the filtered item list would include each item contained in the selected file cabinet in which meets both the following criteria: (1) the item's subject is "Expense Reports"; and (2) at least one addressee or copy recipient is in department 9B2.

In this embodiment, an item cannot pass the address book-based filter of block 119 unless at least one of the names listed for the item at block 117 is contained in the address book. In an alternate embodiment (not shown), if a name listed for an item at block 117 is not contained in the address book, the item passes the filter of block 119, and the reason for the item's passage is noted on the display of block 123.

In the described embodiment of the invention, all the items in the container object are first filtered using filter data for item data fields. Then, the items which pass the first filter are filtered using filter data for address book data fields. In an alternate embodiment (not shown), each item in the container object is filtered using item data fields and address book data fields, then the succeeding item is so filtered.

As shown by the foregoing description, the present invention provides a comprehensive and flexible method for filtering items in a computer container object using data from the items and data from an address book data base to which the computer has access.

It is to be understood that while the described embodiments of the present invention are directed to a computer which is connected to an electronic mail network, the invention may be adapted to any computer in which items having a standard format are stored.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. A computer implemented method for filtering items stored in a container object of a first computer application program using filter data for at least one data field of related entries stored in an address book container object of a second computer application program, said method comprising the step of:

a. entering in the first computer application program filter data for an address book entry data field in the second commuter application program;

b. designating in the first computer application program an item data field in the first computer application program which contains person-identifying data;

c. filtering said items in the first computer application program using said filter data, wherein an item in the first computer application program passes said filtering if:

I. an address book entry data field in the second computer application program contains person-identifying data matching the data contained in the item data field designated in step (b); and II. in the address book entry in the second computer application program containing matching person-identifying data, the data contained in the data field in the second computer application program for which filter data was entered in step (a) matches the filter data corresponding thereto; and d. listing those of said items in the first computer application program which pass said filtering.

2. The method of claim 1, wherein said first computer application program includes at least two container objects in which items are stored, said method further comprising the step of selecting one of said container objects.

3. The method of claim 1, wherein said computer has access to one of a second address book container object of the second computer application and an address book container object of a third application program, said method further comprising the step of selecting one of said address book container objects.

4. The method of claim 1 further comprising the steps of:
 a. entering in the first computer application program filter data for at an item data field in the first computer application program;
 b. filtering said items in the first computer application program using the filter data entered in step (a), wherein an item in the first computer application program passes said filtering if the data contained in the item data field in the first computer application program which data was entered in step (a) matches the filter data corresponding thereto; and
 c. listing those of said items in the first computer application program which pass said filtering.

5. The method of claim 4 further comprising the step of listing only those items in the first computer application program which pass both filters.

6. A computer implemented method for filtering items stored in a container object of a first computer application program using filter data for at least one data field of related entries stored in a container object of a second computer application program, said method comprising the step of:
 a. entering in the first computer application program filter data for an entry data field in the second computer application program;
 b. designating in the first computer application program an item data field in the first computer application program which contains data corresponding to data contained in an entry data field in the second computer application program;
 c. filtering said items in the first computer application program using the filter data entered in step (a), wherein an item in the first computer application program passes said filtering if:
  I. an entry data field in the second computer application program contains data matching the data contained in the item data field in the first computer application program designated in step (b); and
  II. in the entry in the second computer application program containing data which matches the data contained in the item data field in the first computer application program designated in step (b), the entry data field in the second computer application program for which filter data was entered in step (a) matches the filter data corresponding thereto; and
 d. listing those of said items in the first computer application program which pass said filtering.

7. The method of claim 6, wherein the first computer application program includes at least two container objects in which items are stored, said method further comprising the step of selecting one of said container objects.

8. The method of claim 6, wherein said computer has access to one of a second container object of the second computer application program and a container object of a third application program, said method further comprising the step of selecting one of the container objects of the second and third application programs.

9. The method of claim 6 further comprising the step of:
 a. entering in the first computer application program filter data for an item data field in the first computer application program;
 b. filtering the items in the first computer application program using the data entered in step (a), wherein an item in the first computer application program passes said filtering if the data contained the item data field in the first computer application program for which data was entered in step (a) matches the filter data corresponding thereto; and
 c. listing those of said items in the first computer application program which pass said filtering.

10. The method of claim 9 further comprising the step of listing only those items in the first computer application program which pass both filters.

11. A computer implemented method for filtering items stored in a container object of a first computer application program using filter data for at least one data field in said items and at least one data field of related entries stored in a container object of a second computer application program, said method comprising the steps of:
 a. entering in the first commuter application program filter data for at least one item data field in the first computer application program;
 b. entering in the first computer application program filter data for an entry data field in the second computer application program;
 c. designating in the first computer application program an item data field in the first computer application program which contains data corresponding to data contained in an entry data field in the second computer application program;
 d. filtering said items in the first computer application program using the filter data entered in steps (a) and (b), wherein an item in the first computer application program passes said filtering if:
  I. the data contained in each item data field in the first computer application program for which filter data was entered in step (a) matches the filter data corresponding thereto;
  II. an entry data field in the second computer application program contains data matching the data contained in the item data field of the first computer application program designed in step (c); and
  III. in an entry in the second computer application program containing data which matches the data contained in the item data field in the first computer application program designated in step (c), the entry data field in the computer application program for which filter data was entered in step (b) matches the filter data corresponding thereto; and
 e. listing those of said items in the first computer application program which pass said filtering.

12. The method of claim 11, wherein the first computer application program includes at least two container objects in which items are stored, said method further comprising the step of selecting one of said container objects.

13. The method of claim 11, wherein said computer has access to a second container object of the second computer application program and/or a container object of a third application program, said method further comprising the step of selecting one of the container objects of the second and third application programs.

* * * * *